(12) United States Patent
Mangnus et al.

(10) Patent No.: US 9,550,859 B2
(45) Date of Patent: *Jan. 24, 2017

(54) ICI THICKENER COMPOSITION AND USES

(71) Applicant: Elementis Specialties, Inc., East Windsor, NJ (US)

(72) Inventors: Eduardus Maria Mangnus, Deventer (NL); Onno Rienstra, Deventer (NL); Stanley Leon Freeman, Plainsboro, NJ (US); Alart Mulder, Delden (NL); Kenneth F. Smith, Doylestown, PA (US)

(73) Assignee: Elementis Specialties, Inc., East Windsor, NJ (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/465,206

(22) Filed: Aug. 21, 2014

(65) Prior Publication Data

US 2015/0065630 A1    Mar. 5, 2015

Related U.S. Application Data

(60) Provisional application No. 61/873,766, filed on Sep. 4, 2013.

(51) Int. Cl.
| | |
|---|---|
| *C08G 65/331* | (2006.01) |
| *C08G 18/71* | (2006.01) |
| *C09D 7/00* | (2006.01) |
| *C08G 18/48* | (2006.01) |
| *C08G 65/26* | (2006.01) |

(52) U.S. Cl.
CPC ......... *C08G 65/331* (2013.01); *C08G 18/4837* (2013.01); *C08G 18/71* (2013.01); *C08G 65/2603* (2013.01); *C08G 65/2609* (2013.01); *C09D 7/002* (2013.01); *C08G 2650/32* (2013.01); *C08G 2650/58* (2013.01)

(58) Field of Classification Search
CPC .................................................. C08G 2650/58
See application file for complete search history.

(56) References Cited

U.S. PATENT DOCUMENTS

| | | | |
|---|---|---|---|
| 4,155,892 A * | 5/1979 | Emmons | ................ A01N 25/10 504/323 |
| 4,327,008 A | 4/1982 | Schimmel et al. | |
| 4,882,408 A | 11/1989 | Blum | |
| 5,124,389 A | 6/1992 | Mente | |
| 5,594,087 A | 1/1997 | Konig et al. | |
| 6,316,546 B1 | 11/2001 | Ong et al. | |
| 6,916,369 B2 | 7/2005 | Chun et al. | |
| 7,432,325 B2 | 10/2008 | Blankenship et al. | |
| 2002/0052441 A1 | 5/2002 | Burdick et al. | |
| 2004/0106769 A1* | 6/2004 | Hatton | ............... C08G 18/4261 528/403 |
| 2007/0055002 A1 | 3/2007 | Campbell et al. | |
| 2011/0052903 A1 | 3/2011 | Van Oorschot et al. | |
| 2012/0101199 A1 | 4/2012 | Li et al. | |
| 2014/0135468 A1 | 5/2014 | Freeman et al. | |
| 2015/0065630 A1 | 3/2015 | Mangnus et al. | |

OTHER PUBLICATIONS

International Search Report for International Patent Application No. PCT/US2014/052078, dated Nov. 20, 2014, 3 pages.
Written Opinion for International Patent Application No. PCT/US2014/052078, dated Nov. 20, 2014, 5 pages.
Office Action issued in U.S. Appl. No. 14/465,188 dated Feb. 1, 2016.
International Preliminary Report of Patentability for PCT/US2014/052078 dated Mar. 8, 2016.

* cited by examiner

*Primary Examiner* — Michael Pepitone
(74) *Attorney, Agent, or Firm* — Morgan, Lewis & Bockius LLP

(57) ABSTRACT

A composition comprising linked segments of: (a) a polyhydroxy segment derived from a compound independently selected an acyclic polyhydric alcohol having 4 to 6 carbon atoms and 4 to 6 reactive hydroxyl groups; a cyclic polyhydric alcohol having 4 to 6 carbon atoms and 4 to 6 reactive hydroxyl groups, a poly(hydroxyethyl) polyethyleneamine having 4 to 6 reactive hydroxyl groups and combinations thereof; (b) polyoxyalkylene segments wherein each hydroxyl group of the polyhydroxyl segment is linked to a polyoxyalkylene segment; (d) and aliphatic end segments or aromatic end segments, each end segment having 6 to 32 carbon atoms and a hydroxyl reactive group, wherein the mole ratio of the polyoxyalkylene segment to the polyhydroxy segment is at least 4:1 and the mole ratio of the aliphatic or aromatic end segment to the polyhydroxy segment is at least 0.25:1.

18 Claims, No Drawings

ICI THICKENER COMPOSITION AND USES

CROSS-REFERENCE TO RELATED APPLICATIONS

The present application claims the benefit of U.S. Provisional Application No. 61/873,766 filed Sep. 4, 2013, which is incorporated herein by reference in its entirety.

FIELD OF THE INVENTION

The present invention relates to ICI thickener compositions which are useful for modifying the rheological properties of paint formulations.

BACKGROUND OF THE INVENTION

Rheology modifiers are used in waterborne coatings formulations to control viscosity over a wide shear rate range. They may be associative (they associate with the dispersed phase) or non-associative (they thicken the water phase). Associative thickeners may be derived from natural products such as hydrophobically modified cellulose ethers, or prepared from synthetic polymers such as hydrophobically modified ethylene oxide urethane (HEUR) polymers. U.S. Pat. No. 4,155,892 (Emmons et al.) describes the preparation of linear as well as branched HEUR polymers in separate examples.

SUMMARY OF THE INVENTION

In an embodiment, the present disclosure provides for a composition including linked segments of: (a) a polyhydroxy segment derived from a compound independently selected from the group of an acyclic polyhydric alcohol having 4 to 6 carbon atoms and 4 to 6 reactive hydroxyl groups; a cyclic polyhydric alcohol having 4 to 6 carbon atoms and 4 to 6 reactive hydroxyl groups, a poly(hydroxyethyl) polyethyleneamine having 4 to 6 reactive hydroxyl groups and combinations thereof; (b) polyoxyalkylene segments wherein each hydroxyl group of the polyhydroxyl segment is linked to a polyoxyalkylene segment; (c) and aliphatic end segments or aromatic end segments, each aliphatic or aromatic group, of said end segments, having 6 to 32 carbon atoms and a hydroxyl reactive linking group, wherein the mole ratio of the polyoxyalkylene segment to the polyhydroxy segment is at least 4:1 and the mole ratio of the aliphatic or aromatic end segment to the polyhydroxy segment is at least 0.25:1. In one embodiment, the aliphatic end segment or aromatic end segment is linked to an unlinked end of the polyoxyalkylene segment linked to the polyhydoxyl segment.

In another embodiment, the present disclosure provides for a composition comprising linked segments of: (a) a polyhydroxy segment derived from a compound independently selected from the group of an acyclic polyhydric alcohol having 4 to 6 carbon atoms and 4 to 6 reactive hydroxyl groups; a cyclic polyhydric alcohol having 4 to 6 carbon atoms and 4 to 6 reactive hydroxyl groups, an alkoxylated acyclic polyhydric alcohol, an alkoxylated cyclic polyhydric alcohol, a poly(hydroxyethyl) polyethyleneamine having 4 to 6 reactive hydroxyl groups and combinations thereof; (b) aliphatic linking segments or aromatic linking segments, each linking segment having at least two linking groups independently selected from the group consisting of: urethane linking group (O—C(=O)—NH), urea linking group (N(R)—C(=O)—NH) ether linking group (—O—), ester linking group (—C(=O)O—), amine linking group (—NH—), an aminoplast segment, a linking group which is the residue from reaction of an epihalohydrin and a hydroxyl group, and mixtures thereof; (c) polyoxyalkylene segments; (d) and aliphatic end segments or aromatic end segments, each aliphatic or aromatic group, of said end segments, having 6 to 32 carbon atoms and a hydroxyl reactive linking group, wherein the mole ratio of the polyoxyalkylene segment to the polyhydroxy segment is at least 4:1 and the mole ratio of the aliphatic or aromatic end segment to the polyhydroxy segment is at least 0.25:1.

In yet another embodiment, the present disclosure provides for an aqueous thickener composition including the various embodiments of composition described herein and a viscosity suppressing additive selected from an organic co-solvent, a surfactant, a cyclodextrin compound or combinations thereof, and water. In some embodiments, the aqueous thickener composition includes 5 wt. % to 50 wt. % of the composition 0.1 wt. % to 25 wt. % of viscosity suppressant, and the balance being water.

In still yet another embodiment, the present disclosure provides for a method to improve ICI viscosity of an aqueous composition. An effective amount of an ICI thickening composition is provided to an aqueous composition, the ICI thickening composition described herein wherein the ICI viscosity of the aqueous composition ranges from 0.5 to 5.0.

DETAILED DESCRIPTION OF THE EMBODIMENTS

In an embodiment, the composition comprises linked segments of: (a) a polyhydroxy segment derived from a compound independently selected from the group of an acyclic polyhydric alcohol having 4 to 6 carbon atoms and 4 to 6 reactive hydroxyl groups; a cyclic polyhydric alcohol having 4 to 6 carbon atoms and 4 to 6 reactive hydroxyl groups, a poly(hydroxyethyl) polyethyleneamine having 4 to 6 reactive hydroxyl groups and combinations thereof; (b) polyoxyalkylene segments wherein each hydroxyl group of the polyhydroxyl segment is linked to a polyoxyalkylene segment; (c) and aliphatic end segments or aromatic end segments, each aliphatic or aromatic group, of said end segments, having 6 to 32 carbon atoms and a hydroxyl reactive linking group, wherein the mole ratio of the polyoxyalkylene segment to the polyhydroxy segment is at least 4:1 and the mole ratio of the aliphatic or aromatic end segment to the polyhydroxy segment is at least 0.25:1. In one embodiment, the aliphatic end segment or aromatic end segment is linked to an unlinked end of the polyoxyalkylene segment linked to the polyhydoxyl segment.

In another embodiment, the composition comprises linked segments of: (a) a polyhydroxy segment derived from a compound independently selected from the group of an acyclic polyhydric alcohol having 4 to 6 carbon atoms and 4 to 6 reactive hydroxyl groups; a cyclic polyhydric alcohol having 4 to 6 carbon atoms and 4 to 6 reactive hydroxyl groups, an alkoxylated acyclic polyhydric alcohol, an alkoxylated cyclic polyhydric alcohol, a poly(hydroxyethyl) polyethyleneamine having 4 to 6 reactive hydroxyl groups and combinations thereof; (b) aliphatic linking segments or aromatic linking segments, each linking segment having at least two linking groups independently selected from the group consisting of: urethane linking group (O—C(=O)—NH), urea linking group (N(R)—C(=O)—NH) ether linking group (—O—), ester linking group (—C(=O)O—), amine linking group (—NH—), an aminoplast segment, a linking group which is the residue from reaction of an epihalohydrin and a hydroxyl group, and mixtures thereof; (c) polyoxyalkylene segments; (d) and aliphatic end segments or aromatic end segments, each aliphatic or aromatic group, of said end segments, having 6 to 32 carbon atoms and a hydroxyl reactive linking group, wherein the mole ratio of the polyoxyalkylene segment to the polyhydroxy segment is at least 4:1 and the mole ratio of the aliphatic or aromatic end segment to the polyhydroxy segment is at least 0.25:1.

As used herein, "aliphatic" refers to saturated or partially unsaturated linear-, branched-, or cycloaliphatic, or combinations thereof For the various embodiments of the ICI viscosity regulating compositions described herein, such compositions includes segment(s) of a polyhydroxy segment derived from a compound including an acyclic polyhydric alcohol having 4 to 6 carbon atoms and 4 to 6 reactive hydroxyl groups; a cyclic polyhydric alcohol having 4 to 6 carbon atoms and 4 to 6 reactive hydroxyl groups, an alkoxylated acyclic polyhydric alcohol, an alkoxylated cyclic polyhydric alcohol, a poly(hydroxyethyl) polyethyleneamine having 4 to 6 reactive hydroxyl groups and combinations thereof In one embodiment, the acyclic polyhydric alcohol independently includes pentaerythritol, erythritol, xylitol, sorbitol, mannitol and mixtures thereof In another embodiment, the cyclic polyhydric alcohol independently includes inositol, glucopyranose and mixtures thereof In yet another embodiment, the acyclic polyhydric alcohol independently includes pentaerythritol, erythritol, and mixtures thereof In one embodiment, the poly(hydroxyethyl) polyethyleneamine having 4 to 6 reactive hydroxyl groups includes tetra (hydroxyethyl) ethylene diamine, penta(hydroxyethyl) diethylene triamine, hexa(hydroxyethyl) triethylene tetraamine and mixtures thereof In one embodiment, the alkoxylated acyclic polyhydric alcohol independently includes alkoxylated pentaerythritol, alkoxylated erythritol, alkoxylated xylitol, alkoxylated sorbitol, alkoxylated mannitol and mixtures thereof In such embodiments, the alkoxylated acyclic polyhydric alcohol includes 4 to 30 oxyalkylene repeat units. In such embodiments, the alkylene oxide repeat units include ethylene oxide repeat units, propylene oxide repeat units, butylene oxide repeat units and mixtures thereof In another embodiment, the alkoxylated acyclic polyhydric alcohol independently includes ethoxylated pentaerythritol, ethoxylated erythritol, ethoxylated xylitol, ethoxylated sorbitol, ethoxylated mannitol and mixtures thereof In such embodiments, the alkoxylated acyclic polyhydric alcohol includes 4 to 30 ethylene oxide repeat units.

In another embodiment, the alkoxylated cyclic polyhydric alcohol independently includes alkoxylated inositol, alkoxylated glucopyranose and mixtures thereof In such embodiments, the alkoxylated acyclic polyhydric alcohol includes 4 to 30 oxyalkylene repeat units. In yet another embodiment, the alkoxylated cyclic polyhydric alcohol independently includes ethoxylated inositol, ethoxylated glucopyranose and mixtures thereof. In such embodiments, the alkoxylated cyclic polyhydric alcohol includes 4 to 30 ethylene oxide repeat units.

The various embodiments of ICI viscosity regulating composition described herein further includes polyoxyalkylene segments which refers to polyethylene oxide polymer segments or a polyethylene oxide-polypropylene oxide copolymer segments, hereinafter designated polyoxyalkylene segments or polyoxyalkylene segments where the term "oxyalkylene" refers to units having the structure —(O-A)—, with O-A represents the monomeric residue of the polymerization reaction product of $C_{2-8}$ alkylene oxides or diols. Examples of oxyalkylenes include, but are not limited to: oxyethylene with the structure —(OCH$_2$CH$_2$); oxypropylene with the structure —(OCH(CH$_3$)CH$_2$— or —(OCH$_2$(CH—)CH$_3$; oxytrimethylene with the structure —(OCH$_2$CH$_2$CH$_2$)—; 1,2 oxybutylene with the structure —(OCH2CH(C2H5))— or —(OCH(C2H5)CH2)—, and 1,4-oxybutylene with the general structure —(OC$_4$H$_8$)—. Segments containing these units are referred to as "polyoxyalkylenes." The polyoxyalkylene segments can be homopolymeric or copolymeric. Examples of homopolymers of polyoxyalkylene segments include, but are not limited to polyoxyethylene, which contains segments of oxyethylene; polyoxypropylene, which contains segments of oxypropylene; polyoxytrimethylene, which contains segments of oxytrimethylene; and polyoxybutylene, which contains segments of oxybutylene. Examples of polyoxybutylene include a homopolymer containing segments of 1,2-oxybutylene, —(OCH(C$_2$H$_5$)CH$_2$)—; and polytetrahydrofuran, a homopolymer containing segments of 1,4-oxybutylene, or —(OCH$_2$CH$_2$CH$_2$CH$_2$)—.

In other embodiments, the polyoxyalkylene segments can be copolymeric, containing two or more different oxyalkylene segments. The different oxyalkylene groups, within a segment, can be arranged randomly to form a random polyoxyalkylene segment; a tapered polyoxyalkylene segment, or can be arranged in blocks to form a block polyoxyalkylene segment. A tapered polyoxyalkylene segments contains mixtures of alkylene oxides as would occur from the transition of one alkylene oxide to another during the polymerization of different alkylene oxides. Block polyoxyalkylene segments have two or more neighboring polymer blocks, wherein each of the neighboring polymer blocks contain different oxyalkylene blocks, and each polymer block contains at least two of the same oxyalkylene blocks. In one such embodiment, an oxyalkylene group is oxyethylene.

In other embodiments, the polyoxyalkylene segments have a nominal number average molecular weight ranging from 3,000-10,000 g/mole. In other embodiments, the polyoxyethylene segments have a nominal number average molecular weight ranging from 3,000-10,000 g/mole. In another embodiment, the polyoxyalkylene segments have a number average molecular weight of up to about 6,000-9,000 g/mole. In another embodiment, the polyoxyethylene segments have a number average molecular weight of up to about 6,000-9,000 g/mole. In another embodiment, the polyoxyalkylene segments have a number average molecular weight of up to about 7,000-9,000 g/mole. In another embodiment, the polyoxyethylene segments have a number average molecular weight of up to about 7,000-9,000 g/mole.

In certain embodiments, a single polyoxyalkylene segment may have from about 60 to about 225 alkylene oxide repeat units. In certain embodiments, a single polyoxyalkylene segment may have from about 160 to about 210 alkylene oxide repeat units. In such embodiments, the alkylene oxide repeat units include ethylene oxide repeat units, propylene oxide repeat units, butylene oxide repeat units and mixtures thereof.

In certain embodiments the polyoxyalkylene segments are built into the various ICI viscosity regulating compositions via state of the art alkoxylation processes. The polyhydroxyl segments are reacted with ethylene oxide, propylene oxide or butylene oxide or mixtures thereof in the presence of a catalyst and at temperatures ranging from 100-180° C. and pressures from 1-10 Bar. The catalyst can be an alkaline catalyst from the range of NaOH or KOH or a Lewis acid like for example $BF_3$.

In other embodiments, the aliphatic end segments or aromatic end segments include a hydroxyl reactive linking group including an isocyanate group, an epoxide group, an acid group, an ester group or a halide. In one embodiment the isocyanate containing moiety independently includes dodecylisocyanate and stearyl isocyanate. In another embodiment, the epoxide containing moiety independently includes 1,2-epoxyoctane, 1,2-epoxydecane, 1,2-epoxydodecane, 1,2-epoxytetradecane, 1,2-epoxyhexadecane, 1,2-epoxyoctadecane, 2-ethylhexylglycidylether, dodecyl glycidylether, tridecyl glycidylether, hexadecylglycidylether, alkylphenyl glycidylether and mixtures thereof. In another embodiment, the acid containing moiety independently includes 2-ethylhexanoic acid, isononanoic acid, decanoic acid, dodecanoic acid, 2-butyl octanoic acid and mixtures thereof. In another embodiment, the ester containing moiety independently includes methyl decanoate, methyl dodecanoate and ethyl dodecanoate. In yet another embodiment the halide containing moiety independently includes 1-chlorododecane, 1-bromododecane and 1-chloro-2-hydroxy-3-(dodecyloxy)propane.

In some embodiments, the ICI viscosity regulating composition has polyoxyalkylene oxide segment to polyhydric alcohol segment mole ratio ranging from: 4:1 to 6:1. In some such embodiments, the ICI viscosity regulating composition has polyhydric alcohol segment to aliphatic or aromatic end segment mole ratios ranging from: 1:0.25 to 1:24.

The present disclosure further provides for an aqueous thickening composition containing the various embodiments of the ICI viscosity regulating composition described herein, a viscosity suppressant and water. In some embodiments, the aqueous thickening composition may contain 5-50 wt. % of the ICI viscosity regulating composition described herein, 0.1-25 wt. % of a viscosity suppressant; and the balance being water. In some embodiments, the aqueous thickening composition may contain 5-30 wt. % of the ICI viscosity regulating composition described herein, 0.1-25 wt. % of a viscosity suppressant; and the balance being water. In some embodiments, the aqueous thickening composition may contain 15-30 wt. % of the ICI viscosity regulating composition described herein, 5-25 wt. % of a viscosity suppressant; and the balance being water.

In some embodiments, the viscosity suppressant is an organic solvent such as butoxyethanol, diethylene glycol monobutyl ether, triethylene glycol monobutyl ether, propylene glycol, and other water miscible organic solvents. In other embodiments, the viscosity suppressant is an inorganic salt such as sodium chloride. In still other embodiments, the viscosity suppressant is a nonionic or anionic surfactant.

In one embodiment, each nonionic surfactant and anionic surfactant includes one or more hydrophobic group(s) and hydrophilic group(s), each of the hydrophobic group(s) having from: 6 carbon atoms to 10 carbon atoms; or 6 carbon atoms to 8 carbon atoms. In one embodiment, the anionic surfactant includes $M^+$(2-ethylhexyl sulfate$^-$); $M^+$(hexylsulfate$^-$); $M^+$(octylsulfate$^-$) and $M^+$(dioctyl sulfosuccinate$^-$), and mixtures thereof, where $M^+$ includes $NH_4^+$, $Na^+$ and $K^+$. In another embodiment, the anionic surfactant includes sodium 2-ethylhexyl sulfate; sodium hexylsulfate; sodium octylsulfate, sodium dioctyl sulfosuccinate; ammonium 2-ethylhexyl sulfate; ammonium hexylsulfate; ammonium octylsulfate, ammonium dioctyl sulfosuccinate and mixtures thereof. In another embodiment, the anionic surfactant includes sodium 2-ethylhexyl sulfate; sodium octylsulfate, sodium dioctyl sulfosuccinate and mixtures thereof In another embodiment, the nonionic surfactant is 2-ethylhexyl ethoxylate having 2-5 moles ethylene oxide.

In some embodiments, the aqueous thickener blend composition may have a viscosity of up to: 2500 cP; 5000 cP; 10,000 cP; 15,000 cP; 20,000 cP; or 25,000 cP. In one such embodiment, the composition may have a viscosity ranging from: 10 to 2500 cP; 10 to 5000 cP; 10 to 10000 cP; 10 to 15,000 cP; 10 to 20,000 cP; or 10 to 25,000 cP. Brookfield viscosities of such compositions are measured at 25° C. and 10 RPM using a Brookfield RV or RVT. Typically a #1 spindle is used for materials having a Brookfield viscosity of 400-600 cP (40-60 dial reading), a #2 spindle is used for materials having a Brookfield viscosity of 1600-2400 cP and a #3 spindle is used for materials having a Brookfield viscosity of 4000-6000 cP. The following table may also be used to determine the appropriate spindle to use when measuring Brookfield viscosity at 25° C. and 10 RPM:

| Spindle | Factor | Viscosity (cP) | |
|---|---|---|---|
| | | Mid-dial | Max |
| 1 | 10 | 500 | 1000 |
| 2 | 40 | 2000 | 4000 |
| 3 | 100 | 5000 | 10000 |
| 4 | 200 | 10000 | 20000 |
| 5 | 400 | 20000 | 40000 |
| 6 | 1000 | 50000 | 100000 |
| 7 | 4000 | 200000 | 400000 |

In another embodiment, the present invention provides for a method to improve ICI viscosity of an aqueous composition comprising: providing an effective amount of an ICI thickening composition according to the various embodiments described herein to an aqueous composition, wherein the ICI viscosity of the aqueous composition ranges from 0.5 to 5.0.

Paint Formulations

A variety of paint formulations may be formulated using the ICI viscosity regulating composition described herein and/or the aqueous thickening compositions, as described herein. In one embodiment, a paint formulation includes: 10-50 wt. % solids of a resin system; 0.0-2.0 wt. % actives of an associative co-thickener; 0.1-3.0 wt. % actives of the ICI viscosity regulating composition according to the various embodiments discussed herein; and optionally 1-12 wt. % of a colorant composition.

In one embodiment, the ICI viscosity of a paint formulation ranges from 0.5 to 5.0. In another embodiment, the ICI viscosity of a paint formulation ranges from 0.5 to 4.0. In yet another embodiment, the ICI viscosity of a paint formulation ranges from 0.5 to 3.0. In still yet another embodiment, the KU viscosity of a paint formulation is at least 60. In another such embodiment, the KU viscosity of a paint formulation ranges from 60 to 130.

A paint formulation of some embodiments of the present invention may include one or more resin film forming binders. A binder, or resin, is the actual film forming component of paint. It is an essential component of a base paint; and other components listed herein are included optionally, depending on the desired properties of the cured film. Binders can be categorized according to drying, or curing mechanism. The four most common are simple solvent evaporation, oxidative crosslinking, catalyzed polymerization, and coalescence.

In some embodiments, the resin binder is a water dispersible resin, such as a water dispersible alkyd or water dispersible polyurethane. In some embodiments, the resin binder is a water soluble resin. In certain embodiments, the resin binder is an emulsion resin, such as is typically used to manufacture latex paints. In certain embodiments, the resin includes a hydrophobic resin. Representative hydrophobic emulsion resins may include (meth)acrylic resin, a styrene acrylic resin, a styrene resin or other ethylenically unsaturated monomers. Representative examples of hydrophilic emulsion resins may include a vinyl acrylic resin or a vinyl acetate ethylene resin. In certain embodiments, the resin may have a substantially spherical shape and a large particle size or low surface area. In one embodiment, the particle size may be greater than about 200 nm. In a further embodiment, the particle size ranges from about 220 nm to about 650 nm. In certain embodiments, the resin may have a substantially spherical shape and small particle size or high surface area. In one embodiment, the particle size may be less than about 200 nm. In a further embodiment, the particle size ranges from about 40 nm to about 180 nm. In certain embodiments, the resin may have a multilobe shape. Representative resins may include Optive 130 (BASF, acrylic, 160 nm), UCAR 300 (Dow, vinyl acrylic, 260 nm), UCAR 625 (Dow, acrylic, 340 nm), Rhoplex ML-200 (Rohm & Haas, acrylic, 590 nm multilobe), and Neocryl XK-90 (DSM Neoresins, acrylic, 90 nm). In certain embodiments, combinations of resins are used to prepare the base paint.

The paint formulation may also include at least one associative co-thickener. Associative co-thickeners are water soluble, water dispersible, or water swellable polymers that have chemically attached hydrophobic groups. In certain embodiments, a paint formulation includes a condensation polymer associative co-thickener including but not limited to polyether polyurethanes, polyether polyols, polyether polyacetals, polyether aminoplasts and the like. In some embodiments, a paint formulation includes about 0.05 wt % to about 5 wt % as active polymer of a condensation polymer associative co-thickener, about 0.1 wt % to about 3 wt % as active polymer of a condensation polymer associative co-thickener, or about 0.2 wt % to about 1 wt % as active polymer of a condensation polymer associative co-thickener.

In some embodiments, the associative co-thickener includes polyurethane thickener; a hydrophobically modified cellulose; a hydrophobically modified alkali soluble thickener; an alkali soluble thickener; a cellulose thickener; a polyacetalpolyether; polyetherpolyol thickener; smectite clays and mixtures thereof In other embodiments, the associative co-thickeners include nonionic hydrophobically modified materials including nonionic hydrophobically-modified ethylene oxide urethane copolymers, nonionic hydrophobically-modified ethylene oxide ether copolymers, nonionic hydrophobically-modified ethylene oxide glycouril copolymers, hydrophobically-modified alkali soluble emulsions, hydrophobically-modified poly(meth)acrylic acids, hydrophobically-modified hydroxyethyl cellulose, and hydrophobically-modified poly(acrylamide), and mixtures thereof. The number average molecular weights of the associative co-thickeners may range from about 10,000 to about 500,000 g/mole or more, depending on the chemical type of associative thickener. In some embodiments, the number average molecular weight of the associate do-thickeners may range from about 10,000 to about 50,000 g/mole. In some embodiments, the number average molecular weight of the associate co-thickeners may range from about 100,000 to about 300,000 g/mole. In some embodiments, the number average molecular weight of the associate co-thickeners may range from about 400,000 to about 500,000 g/mole or more.

In another embodiment, the associative co-thickener may include an KU associative thickener which is used to increase the low to mid shear viscosity of a composition.

A colorant containing paint formulation of the present invention may also include any suitable colorant. In some embodiments, a predispersed colorant may be added to a paint formulation. It is to be understood that this invention is equally effective with single colorants or mixtures of colorants.

Within the context of this invention, a colorant or colorant compound may include one or more colored pigment(s) which have been dispersed in an aqueous or water-miscible medium external to the paint in which it is intended to be used by use of mechanical energy, i.e., grinding or shearing by means of dispersing equipment such as, for example, a ball mill and a sand mill and then dispersed into a base paint. For the purposes of this disclosure, colorant does not include pigments in a dry undispersed state. The dispersion process is typically achieved by the use of auxiliary compounds such as, for example, surfactants, wetting agents, water-miscible solvents, and dispersants, in addition to mechanical energy. The aqueous or water-miscible medium may also include glycols such as ethylene glycol and propylene glycol, and alcohols such as isopropanol. Dispersants may include polyethylene oxide polymers, polyethylene oxide glycols and others. The aqueous or water-miscible medium may also include extenders such as talc and calcium carbonate; humectants; thickeners; defoamer; and biocides. Such colorants are frequently added to a base paint or tint base at the point-of-sale to produce custom colors.

Pigments which are commonly used to prepare colorants include one or more inorganic or organic pigments, or metal effect agents, or combinations thereof. Examples of suitable pigments include titanium dioxide white, carbon black, lamp black, black iron oxide, red iron oxide, yellow iron oxide, brown iron oxide (a blend of red and yellow oxide with black), phthalocyanine green, phthalocyanine blue, organic red pigment (such as naphthol red, quinacridone red and toluidine red), quinacridone magenta, quinacridone violet, DNA orange, and organic yellow pigment (such as Hansa yellow) and combinations thereof.

The colorants are usually sold in concentrated form (typically 25% to 75% solids by weight) so that modest amounts can be used in a waterborne coating composition to provide a desired range of color intensities while not compromising the properties of the waterborne coating composition unduly. Typical amounts of colorants which are used in architectural coatings are from 2 to 4 fluid ounces of colorant per gallon of base paint for light tint bases and pastels, from 4 to 8 fluid ounces of colorant per gallon of base paint for medium tint bases, and from 6 to 16 fluid ounces of colorant per gallon of base paint for deep tone tint bases. Of course, different colorants and mixtures thereof are frequently used to provide wide latitude in color selection. Such colorants are frequently added to a base paint at the point-of-purchase of the colored paint, such as a paint store, followed by admixing the colorant and the waterborne coating composition by various means such as shaking the can of paint.

A paint system of some embodiments of the present invention may include additional components as suitable to achieve the desire effect, including but not limited to wetting agents, fillers; pigments, such as titanium dioxide, mica, calcium carbonate, silica, zinc oxide, milled glass, aluminum trihydrate, talc, antimony trioxide, fly ash, and clay;

polymer encapsulated pigments, such as polymer-encapsulated or partially encapsulated pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

Paint formulations may be characterized by a variety of properties including Stormer (KU) viscosity, ICI viscosity, sag and leveling.

Stormer viscosity relates to the in-can appearance and is typically measured in Krebs units (KU) using a Stormer viscometer. Mid-shear or Stormer viscosity was measured by the test method described in ASTM D562-01 "Standard Test Method Consistency of Paints Measuring Krebs Unit (KU) Viscosity Using a Stormer-Type Viscometer."

ICI viscosity represents the viscosity of the paint during typical brush and roller application conditions. It is typically measured at 10,000 $sec^{-1}$ by the test method described in ASTM D4287-00 "Standard Test Method for High-Shear Viscosity Using a Cone/Plate Viscometer."

The sag and leveling properties of a film, on a substrate, formed by application of a paint formulation, containing the mid-shear regulating composition, were also measured. Sag values were measured following the test method described in ASTM D4400-99 (Reapproved 2007) "Standard Test Method for Sag Resistance of Paints Using a Multinotch Applicator." The leveling values were measured following the test method described in ASTM D4062-99 (Reapproved 2003) "Standard Test Method for Leveling of Paints by Draw-Down Method."

By way of a non-limiting example, the compounds encompassed herein are used to make high-shear (e.g., ICI) viscosity regulating compositions.

For the purposes of this disclosure, the term "about" means plus or minus 10%.

EXAMPLES

The following examples further describe and demonstrate illustrative embodiments within the scope of the present invention. The examples are given solely for illustration and are not to be construed as limitations of this invention as many variations are possible without departing from the spirit and scope thereof. For reactions using diisocyanate reactants, a catalyst such as an organo-tin or bismuth ester or an amine may be added to accelerate the reaction at the desired temperature. The reactions may be conducted under conditions to minimize branching and/or side reactions.

Comparative Example A

A viscosity regulating composition was prepared as follows: To a 500 ml reaction kettle equipped with a nitrogen inlet, stirrer, Dean Stark trap and a condenser, 45.13 g of PEG 8000 (Mn=7545, 0.006 mol), 0.27 g of trimethylolpropane (MW=134.17, 0.002 mol) and 300 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 2.01 g of hexamethylene diisocyanate (HDI) (MW=168.19: 0.012 mol) and 3 drops of K-Kat 348. The reaction is stirred at 75° C. for 1.5 hour. To this mixture, 1.11 g of 1-dodecanol (MW=186.34, 0.006 mol) was added and the reaction mixture was stirred at 75° C. for 1 hour. The mixture was cooled and poured onto a plastic tray to evaporate toluene. The polymer was further dried in a vacuum oven.

Example 1

A viscosity regulating composition was prepared as follows: To a 500 ml reaction kettle equipped with a nitrogen inlet, stirrer, and a distillation setup, 4.46 g of ethoxylated pentaerythritol (5 EO, Mn=356.7, 0.013 mol) and 1.40 g of 50% potassium hydroxide (catalyst, MW=56.1, 0.012 mol) were added. The reaction mixture was stirred at 250 rpm and dewatered at 125° C., with a $N_2$ purge, 0.5 ml/min, until a water content of <250 ppm was reached. The mixture was heated to 140° C. and 195.80 g ethylene oxide (Mn=44.10; 4.440 mol) was added in 1 hour. The reaction mixture was stirred at 140° C. for 3 hours. The reaction temperature was lowered to 125° C. and to the reaction mixture 18.43 g of 1,2-epoxydodecane (MW=184.32, 0.100 mol) was added. The reaction is stirred at 125° C. for 3 hours, followed by cooling down to 75° C. To this mixture, 1.10 g of acetic acid (MW=60.05, 0.018 mol) was added to neutralize the catalyst and stirred at 75° C. for 30 minutes.

Example 2

A viscosity regulating composition was prepared as follows: To a 500 ml reaction kettle equipped with a nitrogen inlet, stirrer, and a distillation setup, 4.46 g of ethoxylated pentaerythritol (5 EO, Mn=356.7, 0.013 mol) and 1.40 g of 50% potassium hydroxide (catalyst, MW=56.1, 0.012 mol) were added. The reaction mixture was stirred at 250 rpm and dewatered at 125° C., with a $N_2$ purge, 0.5 ml/min, until a water content of <250 ppm was reached. The mixture was heated to 140° C. and 195.80 g ethylene oxide (Mn=44.10; 4.440 mol) was added in 1 hour. The reaction mixture was stirred at 140° C. for 3 hours. The reaction temperature was lowered to 75° C. and 1.10 g of acetic acid (MW=60.05, 0.018 mol) was added to neutralize the catalyst. The temperature was raised to 120° C. and the reaction mixture was dewatered with a $N_2$ purge, 0.5 ml/min, until a water content of <250 ppm was reached. To the reaction mixture 14.35 g of commercial quality stearyl isocyanate (MW=287.0, 0.050 mol) was added. The reaction is stirred at 120° C. for 3 hours, followed by cooling.

Aqueous Composition Example 1

An exemplary viscosity regulating solution composition based on the viscosity regulating composition prepared in Example 1, was prepared by combining 25 wt. % of the viscosity regulating composition; 18.5% of the viscosity suppressant Butyl Carbitol and 56.5% of water.

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A composition comprising linked segments of:
   (a) a polyhydroxy segment derived from a compound independently selected from the group consisting of an acyclic polyhydric alcohol having 4 to 6 carbon atoms and 4 to 6 reactive hydroxyl groups; a cyclic polyhydric alcohol having 4 to 6 carbon atoms and 4 to 6 reactive hydroxyl groups, a poly(hydroxyethyl) polyethyleneamine having 4 to 6 reactive hydroxyl groups and combinations thereof;
   (b) polyoxyalkylene segments wherein each hydroxyl group of the polyhydroxyl segment is linked to a polyoxyalkylene segment, wherein each polyoxyalkylene segment has a weight average molecular weight ranging 3,000 g/mole to 10,000 g/mole;
   (c) and aliphatic end segments or aromatic end segments, each end segment having 6 to 32 carbon atoms and a hydroxyl reactive group, wherein the hydroxyl reactive is an epoxide group, wherein the mole ratio of the polyoxyalkylene segment to the polyhydroxy segment is at least 4:1 and the mole ratio of the aliphatic or aromatic end segment to the polyhydroxy segment is at least 0.25:1.

2. The composition as in claim 1, wherein the poly (hydroxyethyl) polyethyleneamine is independently selected from tetra(hydroxyethyl) ethylene diamine, penta(hydroxyethyl) diethylene triamine, hexa(hydroxyethyl) triethylene tetraamine and mixtures thereof.

3. The composition as in claim 1, wherein the acyclic polyhydric alcohol is independently selected from the group consisting of: pentaerythritol, erythritol, xylitol, sorbitol, mannitol and mixtures thereof.

4. The composition as in claim 1, where the cyclic polyhydric alcohol is independently selected from the group consisting of inositol, glucopyranose and mixtures thereof.

5. The composition of claim 1, wherein the epoxide group is independently derived from the group consisting of: 1,2-epoxyoctane, 1,2-epoxydecane, 1,2- epoxydodecane, 1,2-epoxytetradecane, 1,2- epoxyhexadecane, 1,2- epoxyoctadecane, 2-ethylhexylglycidylether, dodecyl glycidylether, tridecyl glycidylether, hexadecylglycidylether, alkylphenyl glycidylether and mixtures thereof.

6. An aqueous thickener composition comprising: 5 wt. % to 50 wt. % of a composition, comprising linked segments of:
   (a) a polyhydroxy segment derived from a compound independently selected from the group consisting of an acyclic polyhydric alcohol having 4 to 6 carbon atoms and 4 to 6 reactive hydroxyl groups; a cyclic polyhydric alcohol having 4 to 6 carbon atoms and 4 to 6 reactive hydroxyl groups, a poly(hydroxyethyl) polyethyleneamine having 4 to 6 reactive hydroxyl groups and combinations thereof;
   (b) polyoxyalkylene segments wherein each hydroxyl group of the polyhydroxyl segment is linked to a polyoxyalkylene segment;
   (c) and aliphatic end segments or aromatic end segments, each end segment having 6 to 32 carbon atoms and a hydroxyl reactive group, wherein the mole ratio of the polyoxyalkylene segment to the polyhydroxy segment is at least 4:1 and the mole ratio of the aliphatic or aromatic end segment to the polyhydroxy segment is at least 0.25: 1; and
   0.1 wt. % to 25 wt. % of a viscosity suppressing additive is a combination of an organic co-solvent, a surfactant, and the balance being water.

7. A method to improve ICI viscosity of an aqueous composition comprising:
   providing an effective amount of an ICI thickening composition to an aqueous composition, the ICI thickening composition comprises the composition according to claim 1, wherein the ICI viscosity of the aqueous composition ranges from 0.5 to 5.0.

8. The composition as in claim 6, wherein the poly (hydroxyethyl) polyethyleneamine is independently selected from tetra(hydroxyethyl) ethylene diamine, penta(hydroxyethyl) diethylene triamine, hexa(hydroxyethyl) triethylene tetraamine and mixtures thereof.

9. The composition as in claim 6, wherein the acyclic polyhydric alcohol is independently selected from the group consisting of: pentaerythritol, erythritol, xylitol, sorbitol, mannitol and mixtures thereof.

10. The composition as in claim 6, where the cyclic polyhydric alcohol is independently selected from the group consisting of inositol, glucopyranose and mixtures thereof.

11. The composition as in claim 6, wherein the hydroxyl reactive group is independently selected from the group consisting of: isocyanate group, an epoxide group, an acid group, an ester group or a halide group.

12. The composition of claim 11, wherein the isocyanate group is independently derived from the group consisting of dodecylisocyanate, stearyl isocyanate and mixtures thereof.

13. The composition of claim 11, wherein the epoxide group is independently derived from the group consisting of: 1,2-epoxyoctane, 1,2-epoxydecane, 1,2-epoxydodecane, 1,2-epoxytetradecane, 1,2-epoxyhexadecane, 1,2-epoxyoctadecane, 2-ethylhexylglycidylether, dodecyl glycidylether, tridecyl glycidylether, hexadecylglycidylether, alkylphenyl glycidylether and mixtures thereof.

14. The composition of claim 11, wherein the acid group is independently derived from the group consisting of: 2-ethylhexanoic acid, isononanoic acid, decanoic acid, dodecanoic acid, 2-butyl octanoic acid and mixtures thereof.

15. The composition of claim 11, wherein the ester group is independently derived from the group consisting of methyl decanoate, methyl dodecanoate and ethyl dodecanoate.

16. The composition of claim 11, wherein the halide group is independently derived from 1-chlorododecane, 1-bromododecane and 1-chloro-2-hydroxy-3-(dodecyloxy)propane.

17. The composition as in claim 6, wherein each polyoxyalkylene segment has a weight average molecular weight ranging 3,000 g/mole to 10,000 g/mole.

18. An aqueous thickener composition comprising: 5 wt. % to 50 wt. % of a composition comprising linked segments of:
   (a) a polyhydroxy segment derived from a compound independently selected from the group consisting of an acyclic polyhydric alcohol having 4 to 6 carbon atoms and 4 to 6 reactive hydroxyl groups; a cyclic polyhydric alcohol having 4 to 6 carbon atoms and 4 to 6 reactive hydroxyl groups, a poly(hydroxyethyl) polyethyleneamine having 4 to 6 reactive hydroxyl groups and combinations thereof;
   (b) polyoxyalkylene segments wherein each hydroxyl group of the polyhydroxyl segment is linked to a polyoxyalkylene segment;
   (c) and aliphatic end segments or aromatic end segments, each end segment having 6 to 32 carbon atoms and a hydroxyl reactive group, wherein the mole ratio of the polyoxyalkylene segment to the polyhydroxy segment is at least 4:1 and the mole ratio of the aliphatic or aromatic end segment to the polyhydroxy segment is at least 0.25: 1; and 0.1 wt. % to 25 wt. % of a viscosity suppressing additive of a cyclodextrin compound and the balance being water.

* * * * *